United States Patent [19]
Schafer, Sr.

[11] 3,765,098
[45] Oct. 16, 1973

[54] APPARATUS FOR MEASURING PISTON POSITION

[76] Inventor: Arthur W. Schafer, Sr., 215 Branch St., Almont, Mich. 48003

[22] Filed: June 28, 1972

[21] Appl. No.: 267,042

[52] U.S. Cl.......... 33/181 AT, 33/148 R, 33/172 B, 33/DIG. 15
[51] Int. Cl........ G01b 5/02, G01b 5/14, G01b 5/18
[58] Field of Search................ 33/180 AT, 181 AT, 33/147 R, 147 K, 147 L, 148 R, 169 R, 169 B, 172 R, 172 B, DIG. 15

[56] References Cited
UNITED STATES PATENTS

| | | | |
|---|---|---|---|
| 1,475,096 | 11/1923 | Van Wart...................... | 33/DIG. 15 |
| 1,571,641 | 2/1926 | Pratt................................. | 33/148 R |
| 1,758,271 | 5/1930 | Zitzman...................... | 33/180 AT X |
| 2,386,179 | 10/1945 | Andrus.......................... | 33/DIG. 15 |
| 2,523,277 | 9/1950 | Campbell.......................... | 33/172 R |
| 2,872,736 | 2/1959 | Abbott.............................. | 33/172 R |
| 3,195,240 | 7/1965 | Parker............................ | 33/180 AT |
| 3,217,418 | 11/1965 | Wennerberg...................... | 33/172 R |

FOREIGN PATENTS OR APPLICATIONS

| | | | |
|---|---|---|---|
| 40,181 | 5/1931 | France........................... | 33/DIG. 15 |

Primary Examiner—William D. Martin, Jr.
Assistant Examiner—Milton S. Gerstein
Attorney—J. King Harness et al.

[57] ABSTRACT

Apparatus for measuring the axial position of a piston within a cylinder bore of an internal combustion engine via a spark plug opening which intercepts the cylinder bore. A measuring gauge having a linearly movable spindle is mounted on the engine by an adjustable mounting arrangement which is compatible with a wide variety of engine models, including engines having either "90°" or "off-axis" spark plugs. The mounting arrangement may be mounted on the engine by fastening to an engine stud in the vicinity of the spark plug opening and adjusted so that the gauge spindle extends through the spark plug opening in a direction substantially parallel to the axis of the cylinder bore. The spindle is biased against the head of the piston to follow piston movement and develop gauge readings indicative of piston position.

17 Claims, 4 Drawing Figures

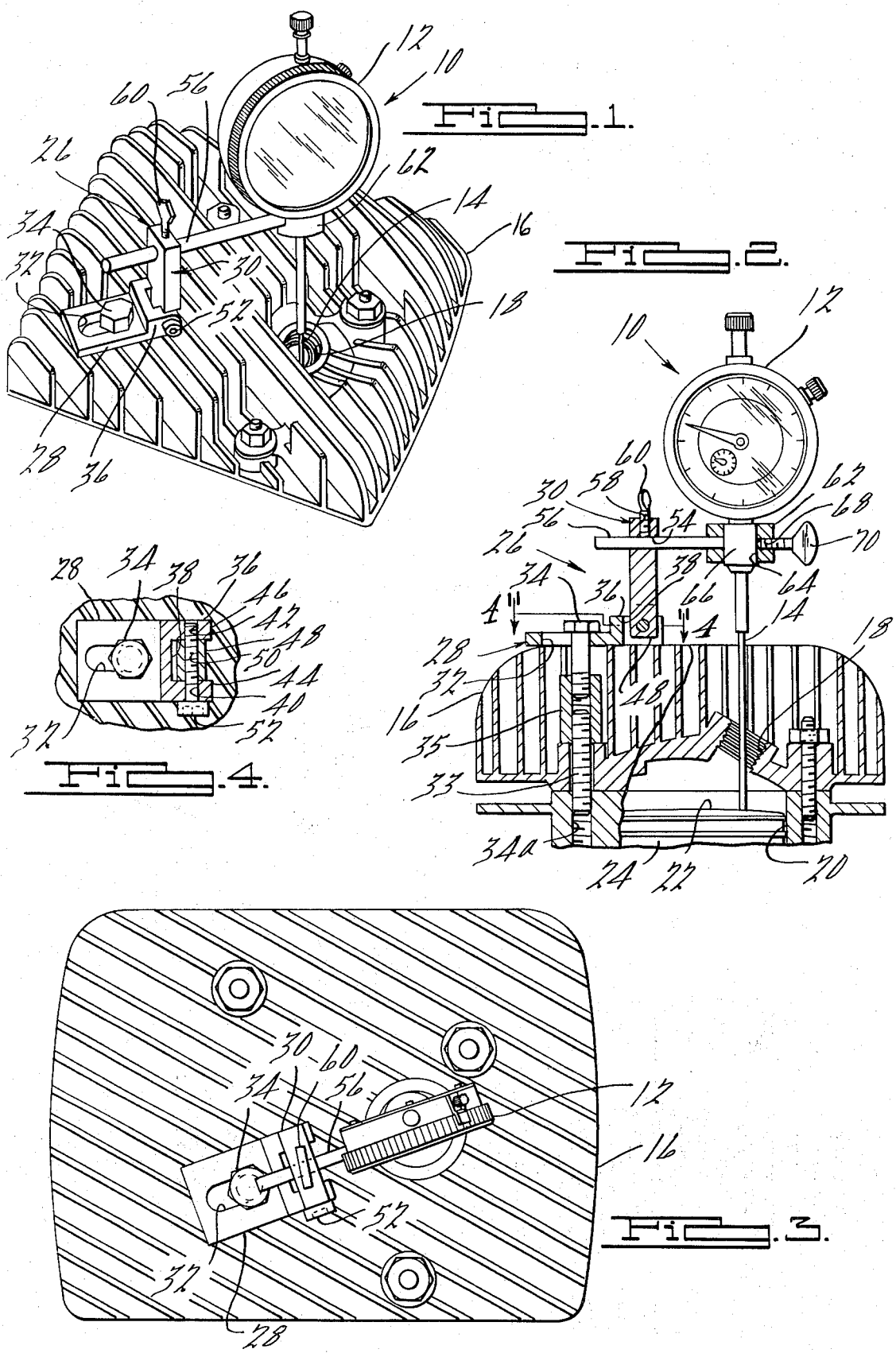

APPARATUS FOR MEASURING PISTON POSITION

BACKGROUND OF THE INVENTION

The present invention relates to devices for measuring the axial position of a piston in a cylinder bore of an internal combustion engine, two cycle or four cycle, for an automobile, snowmobile, motorcycle, etc. In one method of timing the ignition of an internal combustion engine, the axial position of a piston is measured to determine both the top dead center (TDC) position and positions prior to TDC. One method of measuring piston position involves the use of a gauge, such as a dial indicator gauge, having a linearly movable spindle. The gauge is fixedly mounted on the engine with the spindle extending into the cylinder bore through a spark plug opening which intercepts the bore. The spindle is oriented substantially parallel to the axis of the bore and is biased into engagement with the head of the piston to follow piston movement. As the piston is displaced within the bore, the spindle is displaced on the gauge to develop readings indicative of the piston position.

Due to the wide variety of commercially available engine models, it is desirable to have a measuring apparatus which is compatible with a large number, if not substantially all, of the various engines and which can be easily mounted and adjusted on an engine. By providing an essentially universal measuring apparatus which can be used with a large variety of engine models, the requirement of having different measuring apparatus for different engine configurations is eliminated. Moreover, by providing measuring apparatus susceptible of easy mounting and adjustment on an engine, the engine timing procedure can be shortened.

SUMMARY OF THE INVENTION

Among the objects of the present invention are to provide apparatus for measuring the axial position of a piston within a cylinder bore of an internal combustion engine: which may be used with a wide variety of engine models; which is of simpler construction and lower cost than prior apparatus, yet also rugged and durable; which may be used with engines having "90°" as well as "off-axis" spark plugs; and which may be quickly and easily attached to and adjusted on the engine.

The foregoing as well as additional objects and advantages of the invention are achieved by providing a measuring gauge having a linearly movable spindle and an adjustable mounting arrangement which is compatible with a variety of engine models. The mounting arrangement includes a pair of angularly adjustable plates, one of which is adapted to be mounted flat against the engine and the other of which carries a rod to which the gauge is attached. The rod is adjustable both longitudinally of and angularly about its own axis on the second plate. The adjustable nature of the two plates and of the rod on the second plate allow the apparatus to be quickly and easily attached to and adjusted on any of a wide variety of engine models. With the apparatus attached to and adjusted on the engine, two plates are secured in angularly fixed relationship and the rod is secured on the second plate in fixed longitudinal and angular relationship. The sturdy mounting arrangement fixedly supports the gauge on the engine with the gauge spindle extending through the spark plug opening in a direction substantially parallel to the axis of the cylinder bore, and biased against the head of the piston so that an accurate measurement of the piston displacement within the cylinder bore can be obtained.

BRIEF DESCRIPTION OF THE DRAWINGS

The accompanying drawings illustrate a preferred embodiment of the invention in accordance with the best mode presently contemplated for its practice.

FIG. 1 is a perspective view of the measuring apparatus of the present invention mounted on an internal combustion engine.

FIG. 2 is a vertical sectional view through the apparatus of FIG. 1.

FIG. 3 is a top view of the apparatus of FIG. 1.

FIG. 4 is a sectional view taken along line 4—4 of FIG. 2.

DESCRIPTION OF THE PREFERRED EMBODIMENT

The illustrated measuring apparatus 10 comprises a dial indicator gauge 12 having a spindle 14. Gauge 12 is mounted on the cylinder head 16 of an internal combustion engine so that spindle 14 extends through a threaded spark plug opening 18 into a cylinder bore 20. Spindle 14 is linearly movable along its own axis and is resiliently biased downwardly against the upper surface or head, 22 of a piston 24 which reciprocates within bore 20. Spindle 14 is arranged to follow the movement of piston 24 as the piston approaches TDC, and as will be appreciated, gauge 12 converts the linear excursions of spindle 14 into rotational displacement of one or more hands on the face of the gauge which may be read against a calibrated dial to measure the position of piston 24.

Gauge 12 is mounted on cylinder head 16 by means of an adjustable mount 26 which is an essentially universal mount which can accommodate a wide variety of engine models. Mount 26 includes a pair of angularly adjustable aluminum plates 28 and 30. Plate 28 is mounted flat against cylinder head 16 and has an elongated slot 32 for attachment to cylinder head 16. In the illustrated attachment arrangement, an engine stud 33 from which the cylinder head attaching nut (not shown) has been removed has threaded thereon a trheaded adapter collar 35. Plate 28 is mounted on the cylinder head fins by a bolt 34 extending through slot 32 and threaded into collar 35. (Alternatively, a stud passing through slot 32 could be threaded into collar 35 and a nut threaded onto the stud to attach plate 28.) Where stud 33 has a metric thread and bolt 34, an English thread, the lower half of collar 35 has a metric thread for fastening to stud 33 and the upper half, an English thread for fastening bolt 34. Such a collar 35 can be reversed to accommodate an English thread on stud 33 and a metric thread on bolt 34. Thus, collar 35 affords full compatibility of the gage mounting arrangement with both foreign and domestic engines. The right end of plate 28 in FIGS. 1 and 2 is enlarged relative to the left end of the plate 28 and forms a clevis 36 which serves to hingedly connect plates 28 and 30. As best seen in FIG. 4, the notch 38 of clevis 36 is located centrally of the width of plate 28. A pair of aligned circular holes 40 and 42, the latter of which is tapped, extend laterally of plate 28 through the ears 44 and 46 respectively of clevis 36 to intercept notch 38. The juxtaposed end of plate 30 has a tongue 48 whose width is only slightly less than that of notch 38. A circular hole 50 extends laterally through tongue 48 and is aligned with holes 40 and 42 when tongue 48 is positioned within notch 38 of clevis 36. The shank of a screw 52, preferably a hex head screw, passes through holes 40 and 50 and threadingly engages hole 42 to form a hinge pin about whose axis plate 30 is freely pivotable when screw 52 is not fully tightened. Plates 28 and 30 are secured in angularly fixed relationship by tightening screw 52 to advance the screw head against clevis 36 so that the clevis clamps tongue 48 between ears 44 and 46. As will be apparent, screw 52 is actuated by a hex wrench (not shown). Plate 30 includes a circular bore 54 which is perpendicular to and extends completely through the plate. A cylindrical rod 56 passes through bore 54 and is therefore, perpendicular to plate 30. Rod 56 is adjustable on plate 30 both longitudinally of and angularly about its own axis. A threaded hole 58 in plate 30 intercepts bore 54. A thumb wing set screw 60 is threaded into hole 58, and may be manually tightened to securely lock rod 56 in fixed longitudinal and angular relationship on plate 30. A collar 62 is attached to the right-hand end of rod 56 as viewed in FIG. 2. Collar 62 has a circular bore 64 which is transverse to rod 56 and receives a corresponding cylindrical mounting portion 66 of gauge 12 so that spindle 14 is oriented perpendicularly to the axis of rod 56. A threaded hole 68 in collar 62 intercepts bore 64. A thumb wing set screw 70 is threaded into hole 68 and may be manually tightened to lock gauge 12 to collar 62.

While the drawings illustrate the use of apparatus 10 with an engine having an "off-axis" spark plug opening 18 (i.e. the axis of opening 18 is inclined 30° from the axis of bore 20), it will be appreciated that the apparatus can accommodate virtually any type of engine configuration so long as the diameter and angle of opening 18 permit spindle 14 to be aligned substantially parallel to the axis of bore 20. So long as spindle 14 can be so oriented, mount 26 can usually be adjusted so as to pick up any stud in the vicinity of the spark plug opening for attaching plate 28 to the engine. With mount 26 adjusted so that spindle 14 extends into spark plug opening 18 in a direction substantially parallel to bore 20 and is biased into engagement with piston 24, mount 26 fixedly supports gauge 12 on the engine. Now when piston 24 is stroked toward TDC, spindle 14 accurately follows piston 24 to develop readings on gauge 12 which accurately indicate the piston position.

It has been found that by making plates 28 and 30 each about one inch long and the exposed length of rod 56 about 2 ¼ inches, mount 26 is compatible with a variety of engines having various bolt mounting arrangements and various spark plug angles although it will be appreciated that the invention contemplates mounts having other than these specific dimensions. It will also be observed that mount 26 achieves this great versatility of adjustment with only seven parts, namely, plates 28 and 30, screw 52, rod 56, collar 62 and thumb screws 60 and 70. This construction while being relatively simple and of a minimum number of parts is none the less rugged and sturdy. Moreover, the apparatus may be easily and quickly adjusted with the only tool being required to perform the adjustment being a hex wrench for actuating screw 52 to lock plates 28 and 30.

While it will be apparent that the invention herein disclosed is well calculated to achieve the benefits and advantages as hereinabove set forth, it will be appreciated that the invention is susceptible to modification, variation and change without departing from the spirit thereof.

What is claimed is:

1. In an apparatus for measuring the axial position of a piston within a cylinder bore of an internal combustion engine via a spark plug opening intercepting the bore, the combination comprising a gauge having a linearly movable spindle adapted to extend into said bore via said opening in a direction substantially parallel to the axis of the bore and to be resiliently biased against the head of the piston to follow displacement of the piston and develop readings on the gauge indicative of piston position and mounting apparatus for mounting the gauge on the engine comprising first and second plates, the first plate being adapted to be mounted flat against and fastened to the engine, means for hingedly connecting the two plates about a hinge axis such that the second plate is angularly displaceable about the hinge axis relative to the first plate, means for locking the two plates together at a selected angle about the hinge axis, a rod, means for fixedly mounting the gauge on the rod so that the spindle is inclined at an angle to the rod, means for mounting the rod on the second plate at a location disposed from the hinge axis such that the rod is displaceable axially of and angularly about its own axis relative to the second plate and means for locking the rod on the second plate at selected axial and angular positions about its own axis with respect to the second plate.

2. The combination of claim 1 wherein the gauge is mounted on the rod such that the spindle is substantially perpendicular to the rod.

3. The combination of claim 2 wherein the rod is mounted on the second plate such that the rod is substantially perpendicular to the plane of the second plate.

4. The combination of claim 3 wherein the rod is mounted on the second plate such that the rod is substantially perpendicular to the hinge axis.

5. The combination of claim 1 wherein the rod is mounted on the second plate such that the rod is substantially perpendicular to the plane of the second plate.

6. The combination of claim 5 wherein the rod is mounted on the second plate such that the rod is substantially perpendicular to the hinge axis.

7. The combination of claim 1 wherein the rod is mounted on the second plate such that the rod is substantially perpendicular to the hinge axis.

8. The combination of claim 1 wherein said means for hingedly connecting the two plates comprises a clevis on one of the plates and a tongue on the other plate, said tongue being disposed within the notch of the clevis, a bore extending through the clevis coaxial with the hinge axis, a bore extending through the tongue and axially aligned with the clevis bore and hinge pin means extending through said two bores to hingedly connect the two plates.

9. The combination of claim 8 wherein said means for locking said two plates together comprises a screw thread on a portion of said clevis bore and a screw thread on a portion of said hinge pin means threadedly engaging the threaded portion of the clevis bore, a head disposed on said hinge pin means such that when the hinge pin means is rotated in opposite directions about the hinge axis, the head is respectively advanced and retracted axially of the hinge axis to respectively forcibly engage and release the clevis to thereby cause the clevis to respectively clamp and release the tongue.

10. The combination of claim 1 wherein said means for mounting the rod on the second plate comprises a cylindrical bore in the second plate and said rod comprises a cylindrical portion journaled within said cylindrical bore.

11. The combination of claim 10 wherein the cylindrical bore is perpendicular to the plane of the second plate.

12. The combination of claim 11 wherein said means for locking the rod to the second plate comprises a threaded bore intercepting said cylindrical bore and a set screw threaded into said threaded bore to engage and lock the rod in the cylindrical bore.

13. The combination of claim 1 including a slot in the first plate adapted to receive a fastener for attaching the first plate to the engine.

14. In an apparatus for measuring the axial position of a piston within a cylinder bore of an internal combustion engine via a spark plug opening intercepting the bore, the combination comprising a dial indicator gauge having a linearly movable spindle adapted to extend into said bore via said opening in a direction substantially parallel to the axis of the bore and to be resiliently biased against the head of the piston to follow displacement of the piston and develop readings on the gauge indicative of piston position and means for mounting the gauge on the engine comprising a first plate having a slot, said first plate being adapted to be mounted flat against the engine and fastened thereto by a fastener extending through said slot into the engine, a clevis on one end of said first plate having a laterally central notch, a second plate having a tongue at one end thereof, said tongue being disposed within said notch and having a lateral dimension slightly less than the lateral dimension of said notch, a cylindrical bore extending laterally of the second plate completely through said tongue, a clevis bore extending laterally of said first plate completely through said clevis and having a first portion thereof disposed laterally of one side of said tongue and a second portion thereof disposed laterally of the other side of said tongue, said second portion comprising a screw thread, said two clevis bore portions being coaxial with said tongue bore, a screw having a threaded shank and a head, said shank extending into and through said first clevis bore portion and said tongue bore to threadedly engage said screw thread of said second clevis bore portion with said first clevis bore portion and said tongue bore being disposed between the screw head and the second clevis bore portion, said screw head having a transverse dimension greater than the transverse dimension of the first clevis bore portion so that the screw may be rotated to advance the screw head against the clevis and thereby cause the clevis to forceably clamp said tongue within said notch, a cylindrical journal bore extending transversely through the second plate in a direction generally perpendicular to the plane of the second plate, a rod comprising a cylindrical portion journaled within said journal bore, a threaded bore in said second plate intercepting said journal bore, a screw threaded into said threaded bore for engaging and locking the rod to the second plate and means for mounting the dial indicator gauge on the rod so that the spindle is substantially perpendicular to the rod.

15. For measuring the axial position of a piston within the cylinder bore of an internal combustion engine via a spark plug opening intercepting the bore by means of measuring apparatus of the type comprising a gauge having a body and a spindle on the body movable along a linear path relative to the body and resiliently biased in one direction of movement, mounting apparatus for mounting the gauge on the engine such that the spindle extends into the bore via the spark plug opening in a direction substantially parallel to the axis of the bore and is resiliently biased against the head of the piston to follow displacement of the piston and develop readings on the gauge indicative of piston position, said mounting apparatus comprising a first plate adapted to be mounted on the engine, a second plate, means for hingedly mounting and locking the two plates at a selected angle about a hinge axis, an elongated member and means for mounting and locking the elongated member on the second plate at a selected axial position along and at a selected angular orientation about its own axis relative to the second plate and means on the elongated member adapted to fixedly mount the gauge thereon so that the spindle is inclined at an angle to the elongated member.

16. The combination of claim 15 wherein the means for mounting and locking the elongated member on the second plate comprises a cylindrical bore in the second plate, a tapped hole in the second plate intercepting the side wall of the cylindrical bore and a locking screw threadedly engaging said tapped hole, said elongated member comprising a cylindrical portion disposed within the cylindrical bore, said locking screw being operable to engage the cylindrical portion of the elongated member and thereby lock the same to the second plate.

17. The combination of claim 15 wherein the means for hingedly mounting and locking the two plates comprises a clevis on one of the plates, a bore extending through the clevis and intercepting the notch of the clevis, the portion of the clevis bore on one side of the notch comprising a screw thread, a tongue on the other plate disposed within the notch of clevis, a bore extending through the tongue and aligned with the clevis bore, a screw comprising a threaded shank and a head, said shank passing through said clevis bore and said tongue bore and having a portion thereof threadedly engaging the screw thread of the clevis bore such that the tongue bore and the portion of the clevis bore on the other side of the notch are disposed axially between the head of the screw and the portion of the shank threadedly engaging the screw thread on the clevis bore whereby the screw is operable to clamp the tongue within the notch.

* * * * *